US012632426B2

(12) United States Patent
Mehta

(10) Patent No.: US 12,632,426 B2
(45) Date of Patent: May 19, 2026

(54) AUTONOMOUS SUPPLY CHAIN DATA HUB AND PLATFORM

(71) Applicant: Blue Yonder Group, Inc., Scottsdale, AZ (US)

(72) Inventor: Rubesh Mehta, Irving, TX (US)

(73) Assignee: Blue Yonder Group, Inc., Scottsdale, AZ (US)

( * ) Notice: Subject to any disclaimer, the term of this patent is extended or adjusted under 35 U.S.C. 154(b) by 0 days.

(21) Appl. No.: 18/585,478

(22) Filed: Feb. 23, 2024

(65) Prior Publication Data

US 2024/0193140 A1 Jun. 13, 2024

Related U.S. Application Data

(63) Continuation of application No. 17/562,517, filed on Dec. 27, 2021, now Pat. No. 11,934,365.

(60) Provisional application No. 63/136,167, filed on Jan. 11, 2021.

(51) Int. Cl.
| | |
|---|---|
| *G06F 16/00* | (2019.01) |
| *G06F 16/215* | (2019.01) |
| *G06F 16/2455* | (2019.01) |
| *G06N 20/00* | (2019.01) |

(52) U.S. Cl.
CPC ...... *G06F 16/215* (2019.01); *G06F 16/24556* (2019.01); *G06F 16/2456* (2019.01); *G06N 20/00* (2019.01)

(58) Field of Classification Search
USPC ........................................................ 707/692
See application file for complete search history.

(56) References Cited

U.S. PATENT DOCUMENTS

| | | |
|---|---|---|
| 11,361,276 B2 | 6/2022 | Williams et al. |
| 11,544,724 B1 | 1/2023 | Wick et al. |
| 2021/0056447 A1 | 2/2021 | Rangarajan et al. |
| 2021/0287117 A1 | 9/2021 | Dastmalchi et al. |
| 2021/0312488 A1 | 10/2021 | Wick |
| 2022/0036224 A1 | 2/2022 | Sethi et al. |
| 2022/0138550 A1 | 5/2022 | Zhang et al. |

OTHER PUBLICATIONS

Wu (CN-111325280-A), "A Tag Generation Method and System", Jun. 23, 2020, 11 pages. (Year: 2020).*

* cited by examiner

*Primary Examiner* — Bai D Vu
(74) *Attorney, Agent, or Firm* — Spencer Fane LLP; Steven J. Laureanti

(57) ABSTRACT

A system and method of autonomous data hub processing that uses semantic metadata, machine learning models, and a permissioned blockchain to autonomously standardize, identify and correct errors in supply chain data is disclosed. Embodiments input supply chain data stored in a supply chain database, train with the machine learning model trainer, one or more machine learning models to identify one or more data errors in the supply chain data, clean the one or more identified data errors from the supply chain data, and store cleaned supply chain data. Embodiments also update one or more machine learning models to identify one or more data errors in cleaned supply chain data, and join and aggregate one or more sets of cleaned supply chain data.

15 Claims, 4 Drawing Sheets

300

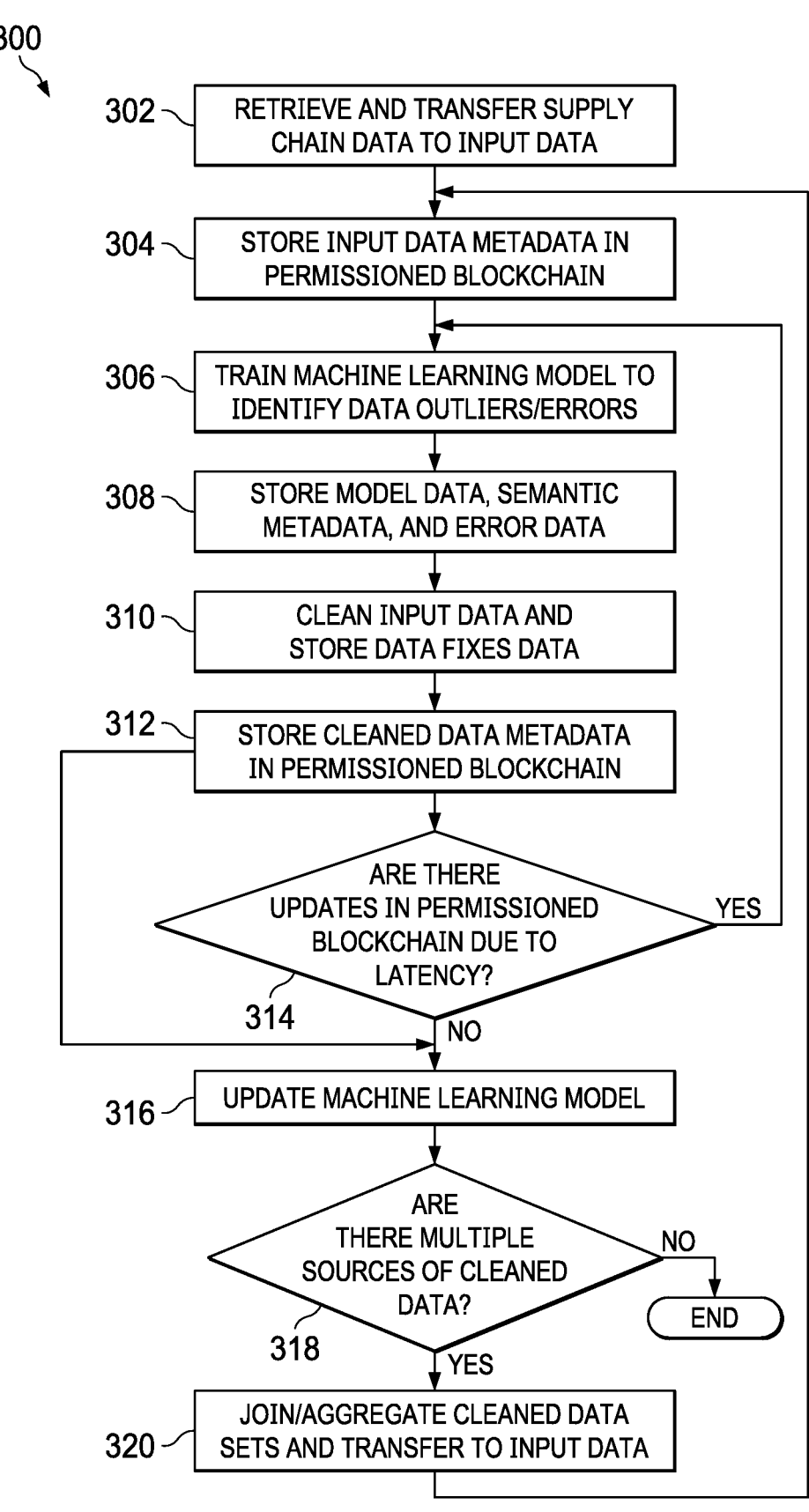

302 — RETRIEVE AND TRANSFER SUPPLY CHAIN DATA TO INPUT DATA

304 — STORE INPUT DATA METADATA IN PERMISSIONED BLOCKCHAIN

306 — TRAIN MACHINE LEARNING MODEL TO IDENTIFY DATA OUTLIERS/ERRORS

308 — STORE MODEL DATA, SEMANTIC METADATA, AND ERROR DATA

310 — CLEAN INPUT DATA AND STORE DATA FIXES DATA

312 — STORE CLEANED DATA METADATA IN PERMISSIONED BLOCKCHAIN

ARE THERE UPDATES IN PERMISSIONED BLOCKCHAIN DUE TO LATENCY?    YES

314    NO

316 — UPDATE MACHINE LEARNING MODEL

ARE THERE MULTIPLE SOURCES OF CLEANED DATA?    NO    END

318    YES

320 — JOIN/AGGREGATE CLEANED DATA SETS AND TRANSFER TO INPUT DATA

FIG. 3

AUTONOMOUS SUPPLY CHAIN DATA HUB AND PLATFORM

CROSS-REFERENCE TO RELATED APPLICATIONS

This application is a continuation of U.S. patent application Ser. No. 17/562,517, filed Dec. 27, 2021, entitled "Autonomous Supply Chain Data Hub and Platform," which claims the benefit under 35 U.S.C. § 119(e) to U.S. Provisional Application No. 63/136,167 filed Jan. 11, 2021, entitled "Autonomous Supply Chain Data Hub and Platform." U.S. patent application Ser. No. 17/562,517 and U.S. Provisional Application No. 63/136,167 are assigned to the assignee of the present application.

TECHNICAL FIELD

The present disclosure relates generally to data hub processing, and more in particular relates to autonomous data hub processing to autonomously detect and correct data errors using machine learning and blockchain technology.

BACKGROUND

Modern supply chains are complex systems that require vast quantities of data from multiple supply chain entities and participants. A single supply chain may comprise, for example, dozens of separate enterprises, participants, and computer systems continuously exchanging large quantities of data stored in multiple incompatible and/or proprietary data formats. Failure to transform or standardize the exchanged data into a single format may prevent supply chain planners from accessing a single version of supply chain truth in a common vocabulary, resulting in incorrect interpretations of data occurring at various entities along the supply chain. Conversely, standardizing and transforming the exchanged data into a single format may introduce systemic or one-off errors into the data and may significantly dilute or completely destroy the data's usefulness. The inability of supply chain systems to autonomously standardize data without also potentially introducing or compounding serious errors is undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 3 illustrates an exemplary method of operating an autonomous data hub to generate machine learning models and clean data, in accordance with an embodiment;

DETAILED DESCRIPTION

Figure 1:
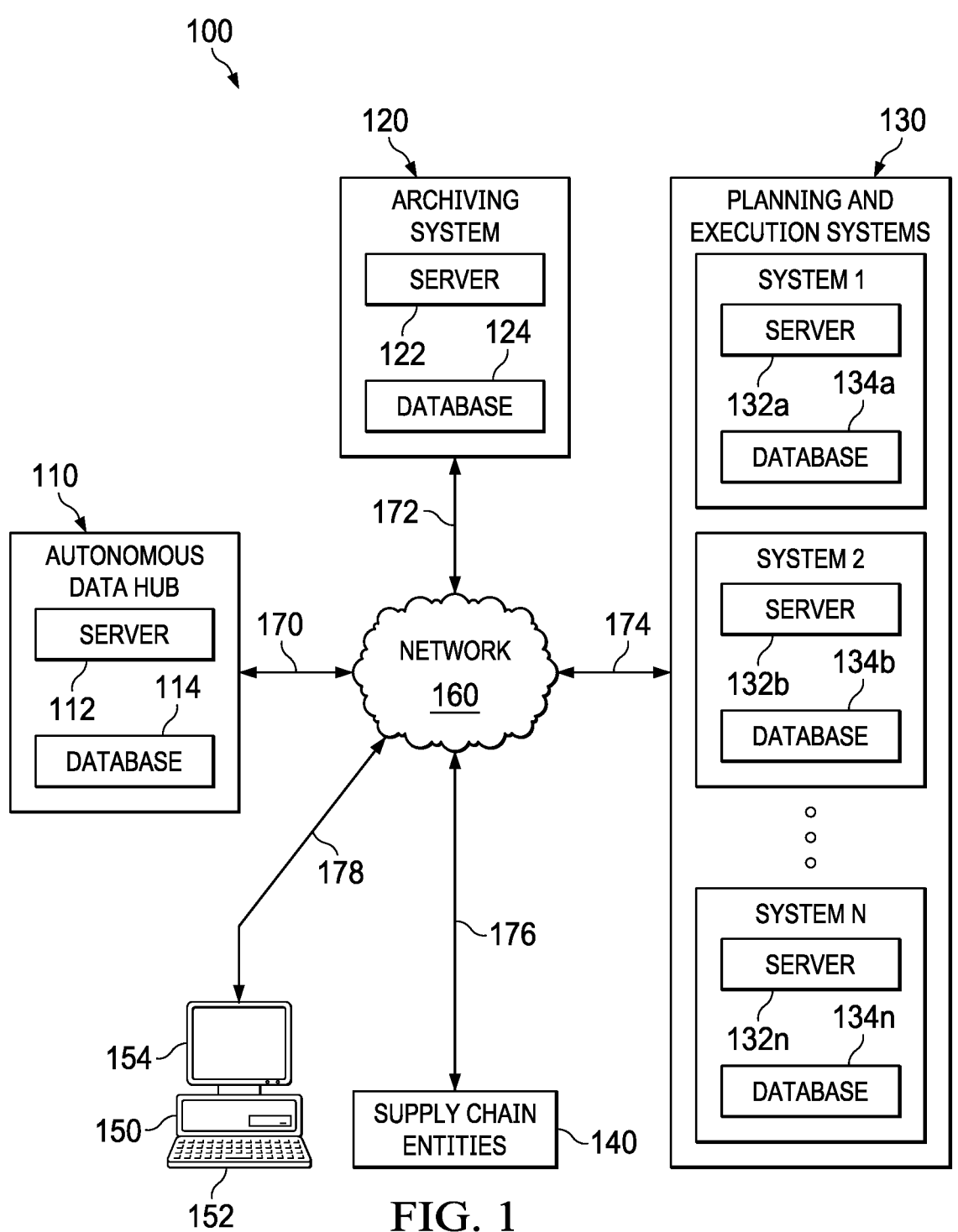
FIG. 1 illustrates an exemplary supply chain network, in accordance with a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described in more detail below, embodiments of the following disclosure provide an autonomous data hub system and method that uses semantic metadata, machine learning models, and a permissioned blockchain to autonomously standardize, identify and correct errors in supply chain data. Embodiments include an autonomous data hub that stores input data from one or more entities participating in a supply chain. Embodiments store, in a permissioned blockchain, input data metadata. Embodiments train one or more machine learning models to identify errors in the input data and to standardize the input data according to one or more standards and/or common vocabularies. Embodiments provide a data quality engine that utilizes the one or more machine learning models, semantic metadata, and the permissioned blockchain to autonomously transform the input data, remove errors, and standardize the input data for subsequent use in the supply chain system. Embodiments continuously train and update the one or more machine learning models to recognize data errors from one or more supply chain entity sources or from internal data transformations, and to better clean and standardize input data, by locating sources of data error and changes made to data using the permissioned blockchain, including reconciliation of errors that were not fixed due to latency in the permissioned blockchain.

Embodiments of the following disclosure automatically detect errors in supply chain data and clean data for use with various purposes throughout the supply chain. The autonomous data hub may accept data from existing supply chain network data interfaces, and may couple the data with permissioned blockchains, blockchain records, and/or blockchain transaction data to detect data outliers. Embodiments continuously learn to better detect and correct data errors. Embodiments utilize permissioned blockchains to track errors to error sources across disparate supply chain entities and sources of information, and to resolve previously generated data errors without disrupting the activities of supply chain entities.

FIG. 1 illustrates exemplary supply chain network 100, in accordance with a first embodiment. Supply chain network 100 comprises autonomous data hub 110, archiving system 120, one or more planning and execution systems 130, one or more supply chain entities 140, computer 150, network 160, and communication links 170-178. Although single autonomous data hub 110, single archiving system 120, one or more planning and execution systems 130, one or more supply chain entities 140, single computer 150, and single network 160 are shown and described, embodiments contemplate any number of autonomous data hubs 110, archiving systems 120, one or more planning and execution systems 130, one or more supply chain entities 140, computers 150, or networks 160, according to particular needs.

In one embodiment, the autonomous data hub 110 comprises server 112 and database 114. As explained in more detail below, autonomous data hub 110 uses a machine learning method to access input data 210, train one or more machine learning models to identify errors in input data 210, transform input data 210 into cleaned data 222 using data quality engine 206, transfer cleaned data 222 to data lake data 224, join and aggregate sets of cleaned data 222 into joined/aggregate data 226, and continuously train and update the one or more machine learning models to recognize additional data errors in the input data 210, cleaned data 222, and joined/aggregate data 226. Autonomous data hub 110 may receive historical data and current data from archiving system 120, one or more planning and execution systems 130, one or more supply chain entities 140, and/or computer 150 of supply chain network 100, as described in more detail herein. According to embodiments, server 112 may comprise one or more modules that provide a user interface (UI) that displays visualizations identifying and quantifying autonomous data hub 110 information, supply chain data 282, machine learning models, and/or other data or information stored in supply chain network 100.

Archiving system 120 of supply chain network 100 comprises server 122 and database 124. Although archiving system 120 is shown as comprising single server 122 and single database 124, embodiments contemplate any suitable number of servers 122 or databases 124 internal to or externally coupled with archiving system 120. Server 122 of archiving system 120 may support one or more processes for receiving and storing data from one or more planning and execution systems 130, one or more supply chain entities 140, and/or one or more computers 150 of supply chain network 100, as described in more detail herein. According to some embodiments, archiving system 120 comprises archive of data received from one or more planning and execution systems 130, one or more supply chain entities 140, and/or one or more computers 150 of the supply chain network 100. Archiving system 120 provides archived data to autonomous data hub 110 and/or planning and execution system to, for example, train a machine learning model or transform data using a machine learning model. Server 122 may store the received data in database 124. Database 124 of archiving system 120 may comprise one or more databases 124 or other data storage arrangements at one or more locations, local to, or remote from, server 122.

According to an embodiment, one or more planning and execution systems 130 comprise server 132 and database 134. Supply chain planning and execution is typically performed by several distinct and dissimilar processes, including, for example, demand planning, production planning, supply planning, distribution planning, execution, transportation management, warehouse management, fulfilment, procurement, business intelligence and analytical services, and the like. Server 132 of one or more planning and execution systems 130 comprises one or more modules, such as, for example, a planning module 260, a solver, a modeler, and/or an engine, for performing actions of one or more planning and execution processes. Server 132 stores and retrieves data from database 134 or from one or more locations in supply chain network 100. In addition, one or more planning and execution systems 130 operate on one or more computers 150 that are integral to or separate from the hardware and/or software that support archiving system 120, and one or more supply chain entities 140.

As shown in FIG. 1, supply chain network 100 comprising autonomous data hub 110, archiving system 120, one or more planning and execution systems 130, and one or more supply chain entities 140 may operate on one or more computers 150 that are integral to or separate from the hardware and/or software that support autonomous data hub 110, archiving system 120, one or more planning and execution systems 130, and one or more supply chain entities 140. One or more computers 150 may include any suitable input device 152, such as a keypad, mouse, touch screen, microphone, or other device to input information. Output device 154 may convey information associated with the operation of supply chain network 100, including digital or analog data, visual information, or audio information. One or more computers 150 may include fixed or removable computer-readable storage media, including a non-transitory computer readable medium, magnetic computer disks, flash drives, CD-ROM, in-memory device or other suitable media to receive output from and provide input to supply chain network 100.

One or more computers 150 may include one or more processors and associated memory to execute instructions and manipulate information according to the operation of supply chain network 100 and any of the methods described herein. In addition, or as an alternative, embodiments contemplate executing the instructions on one or more computers 150 that cause one or more computers 150 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

In addition, or as an alternative, supply chain network 100 may comprise a cloud-based computing system having processing and storage devices at one or more locations, local to, or remote from autonomous data hub 110, archiving system 120, one or more planning and execution systems 130, and one or more supply chain entities 140. In addition, each of the one or more computers 150 may be a workstation, personal computer (PC), network computer, notebook computer, tablet, personal digital assistant (PDA), cell phone, telephone, smartphone, wireless data port, augmented or virtual reality headset, or any other suitable computing device. In an embodiment, one or more users may be associated with autonomous data hub 110 and archiving system 120. These one or more users may include, for example, an "administrator" handling machine learning model training, administration of cloud computing systems, and/or one or more related tasks within supply chain network 100. In the same or another embodiment, one or more users may be associated with one or more planning and execution systems 130, and one or more supply chain entities 140.

One or more supply chain entities 140 may include, for example, one or more retailers, distribution centers, manufacturers, suppliers, customers, and/or similar business entities configured to manufacture, order, transport, or sell one or more products. Retailers may comprise any online or brick-and-mortar store that sells one or more products to one or more customers. Manufacturers may be any suitable entity that manufactures at least one product, which may be sold by one or more retailers. Suppliers may be any suitable entity that offers to sell or otherwise provides one or more items (i.e., materials, components, or products) to one or more manufacturers. Although one example of supply chain network 100 is shown and described, embodiments contemplate any configuration of supply chain network 100, without departing from the scope described herein.

In one embodiment, autonomous data hub 110, archiving system 120, one or more planning and execution systems 130, supply chain entities 140, and computer 150 may be coupled with network 160 using one or more communication links 170-178, which may be any wireline, wireless, or other link suitable to support data communications between autonomous data hub 110, archiving system 120, planning and execution systems 130, supply chain entities 140, computer 150, and network 160 during operation of supply chain network 100. Although communication links 170-178 are shown as generally coupling autonomous data hub 110, archiving system 120, one or more planning and execution systems 130, one or more supply chain entities 140, and computer 150 to network 160, any of autonomous data hub 110, archiving system 120, one or more planning and execution systems 130, one or more supply chain entities 140, and computer 150 may communicate directly with each other, according to particular needs.

In another embodiment, network 160 includes the Internet and any appropriate local area networks (LANs), metropolitan area networks (MANs), or wide area networks (WANs) coupling autonomous data hub 110, archiving system 120, one or more planning and execution systems 130, one or more supply chain entities 140, and computer 150. For example, data may be maintained locally to, or externally of, autonomous data hub 110, archiving system 120, one or more planning and execution systems 130, one or more supply chain entities 140, and one or more computers 150 and made available to one or more associated users of autonomous data hub 110, archiving system 120, one or more planning and execution systems 130, one or more supply chain entities 140, and one or more computers 150 using network 160 or in any other appropriate manner. For example, data may be maintained in a cloud database at one or more locations external to autonomous data hub 110, archiving system 120, one or more planning and execution systems 130, one or more supply chain entities 140, and one or more computers 150 and made available to one or more associated users of autonomous data hub 110, archiving system 120, one or more planning and execution systems 130, one or more supply chain entities 140, and one or more computers 150 using the cloud or in any other appropriate manner. Those skilled in the art will recognize that the complete structure and operation of network 160 and other components within supply chain network 100 are not depicted or described. Embodiments may be employed in conjunction with known communications networks and other components.

Although the disclosed systems and methods are described below primarily in connection with supply chain networks solely for the sake of clarity, the systems and methods herein are applicable to many other applications involving data hubs and the storage of data, including, for example, medical databases, insurance records, and statistical analyses.

Figure 2:
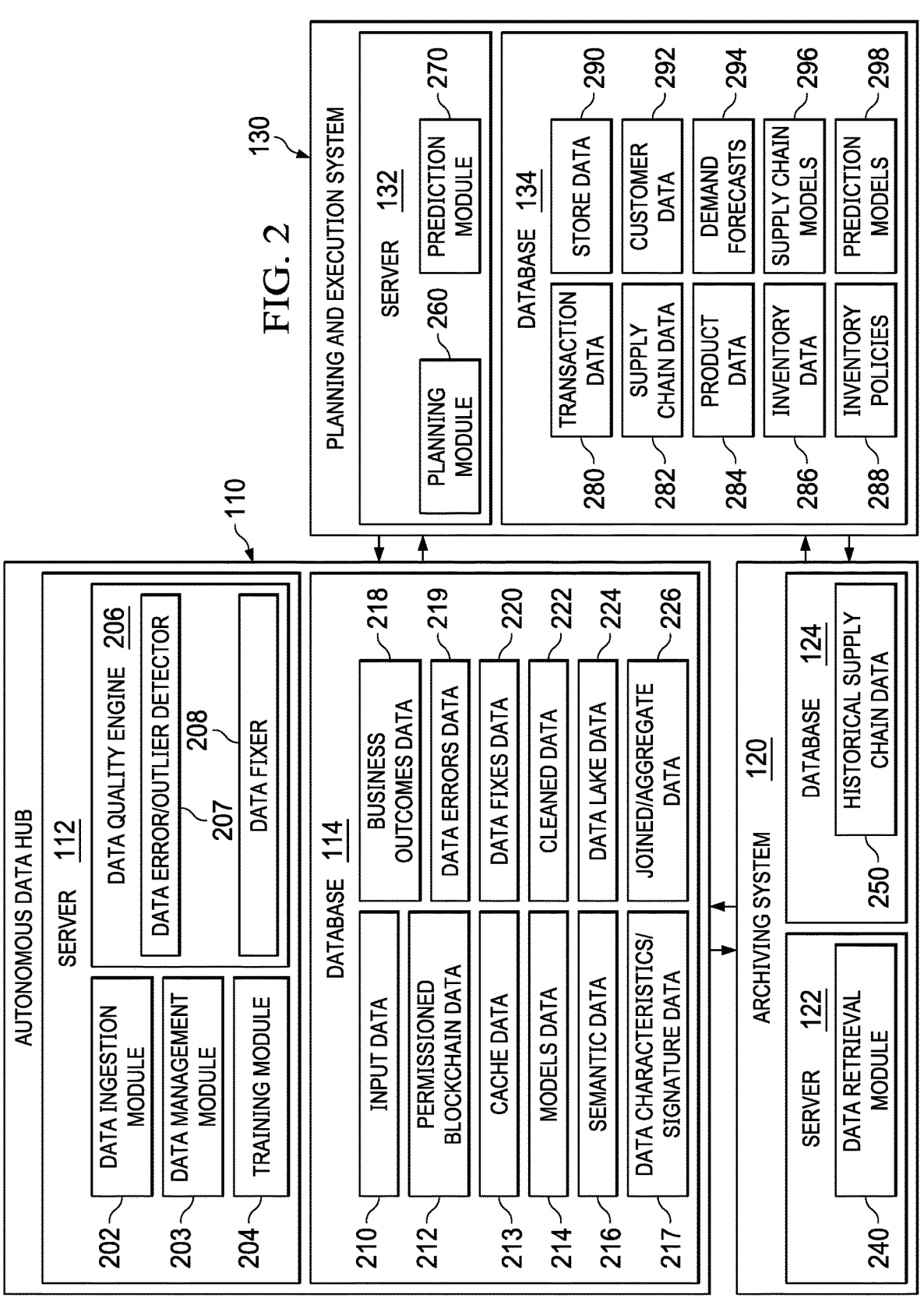
FIG. 2 illustrates the autonomous data hub, the archiving system, and the planning and execution system of FIG. 1 in greater detail, in accordance with an embodiment.

FIG. 2 illustrates autonomous data hub 110, archiving system 120, and planning and execution system 130 of FIG. 1 in greater detail, in accordance with an embodiment. Autonomous data hub 110 may comprise server 112 and database 114, as described above. Although autonomous data hub 110 is shown as comprising single server 112 and single database 114, embodiments contemplate any suitable number of servers 112 or databases 114 internal to or externally coupled with autonomous data hub 110.

Server 112 of autonomous data hub 110 comprises data ingestion module 202, training module 204, and data quality engine 206. Although server 112 is shown and described as comprising a single data ingestion module 202, training module 204, data quality engine 206, and data management module 209, embodiments contemplate any suitable number or combination of these located at one or more locations, local to, or remote from autonomous data hub 110, such as on multiple servers 112 or computers 150 at one or more locations in supply chain network 100.

Database 114 of autonomous data hub 110 may comprise one or more databases 114, cloud data storages, or other data storage arrangements at one or more locations, local to, or remote from, server 112. In an embodiment, database 114 of autonomous data hub 110 comprises input data 210, permissioned blockchain data 212, cache data 213, models data 214, semantic metadata 216, data characteristics/signature data 217, business outcomes data 218, data errors data 219, data fixes data 220, cleaned data 222, data lake data 224, and joined/aggregate data 226. Although database 114 of autonomous data hub 110 is shown and described as comprising input data 210, permissioned blockchain data 212, cache data 213, models data 214, semantic metadata 216, data characteristics/signature data 217, business outcomes data 218, data errors data 219, data fixes data 220, cleaned data 222, data lake data 224, and joined/aggregate data 226, embodiments contemplate any suitable number or combination of these, located at one or more locations, local to, or remote from, autonomous data hub 110 according to particular needs.

In one embodiment, data ingestion module 202 of autonomous data hub 110 receives data from archiving system 120, supply chain planning and execution system 130, one or more supply chain entities 140, one or more computers 150, or one or more data storage locations local to, or remote from, supply chain network 100 and autonomous data hub 110. According to embodiments, data ingestion module 202 may prepare the received data for use in training one or more machine learning models and/or for cleaning by data quality engine 206, such as, for example, by checking the received data for errors in the range, sign, and/or value and use statistical analysis to check the quality or the correctness of the received data. Data ingestion module 202 stores received data in input data 210 of database 114. Data ingestion module 202 may store input data 210 metadata, including but not limited to data relating to the original source of the input data 210 within supply chain network 100, the date and time at which input data 210 was last modified and by what system or entity in supply chain network 100, and a complete list of all modifications made to input data 210, in permissioned blockchain data 212.

According to embodiments, data management module 203 may prepare a subset of input data 210 metadata for quick access by training module 204 and data quality engine 206 to compensate for latency in metadata retrieved from permissioned blockchain data 212. Data management module 203 may store a subset of input data 210 metadata, including but not limited to data relating to the original source of the input data 210 within supply chain network 100, the date and time at which input data 210 was last modified and by what system or entity in supply chain network 100, and a list of all modifications made to the subset of input data 210, in cache data 213.

Training module 204 may access input data 210, permissioned blockchain data 212, cache data 213, and/or any other data stored in the autonomous data hub database 114, archiving system 120, and/or planning and execution system 130. Training module 204 uses input data 210, permissioned blockchain data 212, cache data 213, and/or other data to generate and train one or more machine learning models to identify errors in input data 210, cleaned data 222, and joined/aggregate data 226 and to standardize input data 210, cleaned data 222, and joined/aggregate data 226 according to one or more standards and/or common vocabularies. Training module 204 may use one or more common optimization processes and/or one or more cyclic boosting processes to train one or more machine learning models. Having trained one or more machine learning models, training module 204 stores the one or more machine learning models in models data 214.

Data quality engine 206 may access input data 210, permissioned blockchain data 212, cache data 213, models data 214, semantic metadata 216, data characteristics/signature data 217, business outcomes data 218, data errors data 219, data fixes data 220, cleaned data 222, data lake data 224, and joined/aggregate data 226, and/or any other data stored in autonomous data hub database 114, archiving system 120, and/or planning and execution system 130. In an embodiment, data quality engine 206 comprises data error/outlier detector 207 and data fixer 208. Data error/outlier detector 207 may use one or more machine learning models stored in models data 214, data stored in semantic metadata 216, data characteristics/signature data 217, business outcomes data 218, data errors data 219, and data fixes data 220, permissioned blockchain data 212, and cache data 213 to autonomously detect errors and outliers in input data 210. Data fixer 208 autonomously removes errors and standardizes input data 210, cleaned data 222, and joined/aggregate data 226 for subsequent use in the supply chain system. Data quality engine 206 may store the transformed input data 210 as cleaned data 222 in data lake data 224. In one embodiment, data quality engine 206 may retrieve cleaned data 222 from data lake data 224, join or aggregate multiple sets of cleaned data 222 and store as joined/aggregate data 226.

Input data 210 of autonomous data hub database 114 comprises any data collected and stored throughout supply chain network 100. In an embodiment, input data 210 may comprise, in part, a selection of one or more periods of historical supply chain data 250 aggregated or disaggregated at various levels of granularity. According to one embodiment, input data 210 comprises historic sales patterns, prices, promotions, weather conditions, and other factors influencing future demand of a particular item sold in a given store on a specific day. Input data 210 may also comprise time series data, such as, for example, a list of products sold at various locations or retailers at recorded dates and times. As described in more detail below, autonomous data hub 110 may receive input data 210 from archiving system 120, one or supply chain planning and execution systems 130, one or more supply chain entities 140, computer 150, or one or more data storage locations local to, or remote from, supply chain network 100 and autonomous data hub 110.

Permissioned blockchain data 212 may store metadata related to input data 210, cleaned data 222 and/or joined/aggregate data 226 in a blockchain list of records. Permissioned blockchain data 212 may provide cryptographic hashes, timestamps, and/or other transaction data 280 for each change made to any component of input data 210, cleaned data 222 and/or joined/aggregate data 226 throughout supply chain network 100. In one embodiment, permissioned blockchain data 212 comprises Items 402 that are manufactured by a certain manufacturer recorded with their attributes in a blockchain, Locations 404 across the supply chain (including factories, distribution centers, warehouses, retail stores) recorded in a blockchain, items that are valid at a certain location recorded in a blockchain as ItemLocations 406, Inventory on Hand recorded in a blockchain at different locations and updated whenever it changes with transactions in a blockchain, and InventoryTransactions 408 (e.g. sales transactions)—where the inventory picture changes—recorded by the retailer in a blockchain. In another embodiment, data ingestion module 202 records Items 402, Locations 404, ItemLocations 406, Inventory on Hand, and InventoryTransactions 408 in permissioned blockchain data 212. By way of example only and not by way of limitation, in an embodiment in which input data 210 comprises, in part, sales transactions for items sold at separate retailers throughout supply chain network 100, permissioned blockchain data 212 may store metadata recording every sales transaction (including the date of the transaction, the amount of the transaction and the products sold in the transaction, the supply chain entities 140 involved in the transaction) as well as metadata recording the chain of custody of every sales transaction (including which entity initially recorded each transaction, and the dates, times, and entities responsible for every edit made to transaction data 280 throughout the supply chain). According to embodiments, permissioned blockchain data 212 may further store any supply chain data 282 in a blockchain format, including but not limited to models data 214, semantic metadata 216, data characteristics/signature data 217, business outcomes data 218, data errors data 219, data fixes data 220, and/or historical supply chain data 250. Permissioned blockchain data 212 may permit training module 204 and/or data quality engine 206 to identify the specific source and time at which one or more data errors were introduced into input data 210, cleaned data 222 and/or joined/aggregate data 226, the manner in which the one or more data errors occurred, and/or other information about one or more data errors, including errors due to latency in permissioned blockchain data 212. Cache data 213 may store a subset of metadata related to input data 210, cleaned data 222 and/or joined/aggregate data 226 as a quickly accessible subset of permissioned blockchain data 212.

Models data 214 may store one or more machine learning models, generated by training module 204 as described above. Semantic metadata 216 may allow data quality engine 206 to map existing data interfaces and data transformations that occur throughout supply chain network 100, using a common vocabulary and permissioned blockchain data 212. Semantic metadata 216 may include data relating to separate machine learning models stored in models data 214, and the capabilities, likely outputs, parameters, potential advantages/disadvantages, and situations in which data quality engine 206 may select each of the one or more machine learning models to execute the actions of the method described below. Semantic metadata 216 may include data describing how derived representations may be based on base representations. According to embodiments, semantic metadata 216 also comprises data that represents the entire supply chain network 100 and supply chain models 296 associated with supply chain network 100, and model mappings to intermediate representation and aggregates.

Data characteristics/signature data 217 may include data and attributes that may be used by one or more machine learning models to understand the kind of data and to apply inference on it. Business outcomes data 218 may include data representing key performance indicators (including sales and quantity of satisfied customers) based on the value generated from operating on data stored in autonomous data hub database 114. According to embodiments, one or more machine learning models may be updated to improve learning based on quality improvements that result in better business outcomes, as measured by business outcomes data 218.

According to embodiments, data errors data 219 may comprise data relating to one or more systemic errors and/or one or more one-off errors and/or sources of error, identified by the one or more machine learning models, present in input data 210, permissioned blockchain data 212, cache data 213, cleaned data 222 and/or joined/aggregate data 226. Data fixes data 220 may comprise data related to one or more data fixes to correct systemic errors and/or one or more one-off errors. For example, in an embodiment in which one supply chain manufacturer in supply chain network 100 chronically inputs supply chain data 282 that under-reports resource consumption at the manufacturer by 10%, data quality engine 206 may detect this chronic under-reporting and may record, in data fixes data 220, a command to multiply all resource consumption data input by that manufacturer by an additional 10% to arrive at the correct figure.

Cleaned data 222 may comprise input data 210 that data quality engine 206 has transformed, standardized, and stored as cleaned data 222. In an embodiment, data quality engine 206 may use one or more machine learning models stored in models data 214, data stored in semantic metadata 216, permissioned blockchain data 212, and cache data 213 to autonomously transform input data 210, remove errors, and store the transformed data as cleaned data 222 of autonomous data hub database 114. Data lake data 224 may comprise a secure reservoir for supply chain data, which is made available for qualified extremely fast access and summarization. In an embodiment, cleaned data 222 may be stored in data lake data 224. Embodiments contemplate data lake data 224 may be located at one or more locations, local to, or remote from, autonomous data hub 110 according to particular needs.

Joined/aggregate data 226 may comprise multiple sets of cleaned data 222 which are joined or aggregated, standardized, and stored as joined/aggregate data 226. In an embodiment, data quality engine 206 may use one or more machine learning models stored in models data 214, data stored in semantic metadata 216, permissioned blockchain data 212, and cache data 213 to autonomously join or aggregate sets of cleaned data 222, remove errors, and store as joined/aggregate data 226 of autonomous data hub database 114. In another embodiment, multiple sets of cleaned data 222 may be retrieved from data lake data 224.

As discussed above, archiving system 120 comprises server 122 and database 124. Although archiving system 120 is shown as comprising single server 122 and single database 124, embodiments contemplate any suitable number of servers 122 or databases 124 internal to or externally coupled with archiving system 120.

Server 122 of archiving system 120 comprises data retrieval module 240. Although server 122 is shown and described as comprising single data retrieval module 240, embodiments contemplate any suitable number or combination of data retrieval modules 240 located at one or more locations, local to, or remote from archiving system 120, such as on multiple servers 122 or computers 150 at one or more locations in supply chain network 100.

In one embodiment, data retrieval module 240 of archiving system 120 receives historical supply chain data 250 from one or more supply chain planning and execution systems 130 and one or more supply chain entities 140 and stores the received historical supply chain data 250 in archiving system database 124. According to one embodiment, data retrieval module 240 of autonomous data hub 110 may prepare historical supply chain data 250 for use as input data 210 of autonomous data hub 110 by checking historical supply chain data 250 for errors and transforming historical supply chain data 250 to normalize, aggregate, and/or rescale historical supply chain data 250 to allow direct comparison of data received from different planning and execution systems 130, one or more supply chain entities 140, and/or one or more other locations local to, or remote from, archiving system 120. According to embodiments, data retrieval module 240 receives data from one or more sources external to supply chain network 100, such as, for example, weather data, special events data, social media data, calendar data, and the like and stores the received data as historical supply chain data 250.

Database 124 of archiving system 120 may comprise one or more databases 124 or other data storage arrangements at one or more locations, local to, or remote from, server 122. Database 124 of archiving system 120 comprises, for example, historical supply chain data 250. Although database 124 of archiving system 120 is shown and described as comprising historical supply chain data 250, embodiments contemplate any suitable number or combination of data, located at one or more locations, local to, or remote from, archiving system 120, according to particular needs.

Historical supply chain data 250 comprises historical data received from autonomous data hub 110, archiving system 120, one or more supply chain planning and execution systems 130, one or more supply chain entities 140, and/or computer 150. Historical supply chain data 250 may comprise, for example, weather data, special events data, social media data, calendar data, and the like. In an embodiment, historical supply chain data 250 may comprise, for example, historic sales patterns, prices, promotions, weather conditions and other factors influencing future demand of the number of one or more items sold in one or more stores over a time period, such as, for example, one or more days, weeks, months, years, including, for example, a day of the week, a day of the month, a day of the year, week of the month, week of the year, month of the year, special events, paydays, and the like.

As described above, planning and execution system 130 comprises server 132 and database 134. Although planning and execution system 130 is shown as comprising a single server 132 and a single database 134, embodiments contemplate any suitable number of servers 132 or databases 134 internal to or externally coupled with planning and execution system 130.

Server 132 of planning and execution system 130 comprises planning module 260 and prediction module 270. Although server 132 is shown and described as comprising a single planning module 260 and a single prediction module 270, embodiments contemplate any suitable number or combination of planning modules 260 and prediction modules 270 located at one or more locations, local to, or remote from planning and execution system 130, such as on multiple servers 132 or computers 150 at one or more locations in supply chain network 100.

Database 134 of planning and execution system 130 may comprise one or more databases 134 or other data storage arrangements at one or more locations, local to, or remote from, server 132. Database 134 of planning and execution system 130 comprises, for example, transaction data 280, supply chain data 282, product data 284, inventory data 286, inventory policies 288, store data 290, customer data 292, demand forecasts 294, supply chain models 296, and prediction models 298. Although database 134 of planning and execution system 130 is shown and described as comprising transaction data 280, supply chain data 282, product data 284, inventory data 286, inventory policies 288, store data 290, customer data 292, demand forecasts 294, supply chain models 296, and prediction models 298, embodiments contemplate any suitable number or combination of data, located at one or more locations, local to, or remote from, supply chain planning and execution system 130, according to particular needs.

Planning module 260 of planning and execution system 130 works in connection with prediction module 270 to generate a plan based on one or more predicted retail volumes, classifications, or other predictions. By way of example and not of limitation, planning module 260 may comprise a demand planner that generates demand forecast 294 for one or more supply chain entities 140. Planning module 260 may generate demand forecast 294, at least in part, from predictions and calculated factor values for one or more causal factors with residual time series corrections, received from prediction module 270. By way of a further example, planning module 260 may comprise an assortment planner and/or a segmentation planner that generates product assortments that match causal effects calculated for one or more customers or products by prediction module 270, which may provide for increased customer satisfaction and sales, as well as reducing costs for shipping and stocking products at stores where they are unlikely to sell.

Prediction module 270 of planning and execution system 130 applies samples of transaction data 280, supply chain data 282, product data 284, inventory data 286, store data 290, customer data 292, demand forecasts 294, and other data to prediction models 298 to generate predictions and calculated factor values for one or more causal factors. According to embodiments, prediction module 270 of planning and execution system 130 predicts a volume Y (target or label) from a set of causal factors X along with causal factors strengths that describe the strength of each causal factor variable contributing to the predicted volume, with residual time series corrections applied using autocorrelated time series data. According to some embodiments, prediction module 270 generates predictions at daily intervals. However, embodiments contemplate longer and shorter prediction phases that may be performed, for example, weekly, twice a week, twice a day, hourly, or the like.

Transaction data 280 of planning and execution system database 134 may comprise recorded sales and returns transactions and related data, including, for example, a transaction identification, time and date stamp, channel identification (such as stores or online touchpoints), product identification, actual cost, selling price, sales volume, customer identification, promotions, and or the like. In addition, transaction data 280 is represented by any suitable combination of values and dimensions, aggregated or un-aggregated, such as, for example, sales per week, sales per week per location, sales per day, sales per day per season, or the like.

Supply chain data 282 may comprise any data of one or more supply chain entities 140 including, for example, item data, identifiers, metadata (comprising dimensions, hierarchies, levels, members, attributes, cluster information, and member attribute values), fact data (comprising measure values for combinations of members), business constraints, goals and objectives of one or more supply chain entities 140.

Product data 284 of database 134 may comprise products identified by, for example, a product identifier (such as a Stock Keeping Unit (SKU), Universal Product Code (UPC) or the like), and one or more attributes and attribute types associated with the product ID. Product data 284 may comprise data about one or more products organized and sortable by, for example, product attributes, attribute values, product identification, sales volume, demand forecast 294, or any stored category or dimension. Attributes of one or more products may be, for example, any categorical characteristic or quality of a product, and an attribute value may be a specific value or identity for the one or more products according to the categorical characteristic or quality, including, for example, physical parameters (such as, for example, size, weight, dimensions, color, and the like).

Inventory data 286 of database 134 may comprise any data relating to current or projected inventory quantities or states, order rules, or the like. For example, inventory data 286 may comprise the current level of inventory for each item at one or more stocking points across supply chain network 100. In addition, inventory data 286 may comprise order rules that describe one or more rules or limits on setting an inventory policy, including, but not limited to, a minimum order volume, a maximum order volume, a discount, and a step-size order volume, and batch quantity rules. According to some embodiments, planning and execution system 130 accesses and stores inventory data 286 in database 134, which may be used by planning and execution system 130 to place orders, set inventory levels at one or more stocking points, initiate manufacturing of one or more components, or the like in response to, and based at least in part on, a forecasted demand of autonomous data hub 110.

Inventory policies 288 of database 134 may comprise any suitable inventory policy describing the reorder point and target quantity, or other inventory policy parameters that set rules for autonomous data hub 110 and/or planning and execution system 130 to manage and reorder inventory. Inventory policies 288 may be based on target service level, demand, cost, fill rate, or the like. According to embodiments, inventory policies 288 comprise target service levels that ensure that a service level of one or more supply chain entities 140 is met with a certain probability. For example, one or more supply chain entities 140 may set a service level at 95%, meaning supply chain entities 140 will set the desired inventory stock level at a level that meets demand 95% of the time. Although a particular service level target and percentage is described, embodiments contemplate any service target or level, such as, for example, a service level of approximately 99% through 90%, a 75% service level, or any suitable service level, according to particular needs. Other types of service levels associated with inventory quantity or order quantity may comprise, but are not limited to, a maximum expected backlog and a fulfillment level. Once the service level is set, autonomous data hub 110 and/or planning and execution system 130 may determine a replenishment order according to one or more replenishment rules, which, among other things, indicates to one or more supply chain entities 140 to determine or receive inventory to replace the depleted inventory. By way of example only and not by way of limitation, inventory policy for non-perishable goods with linear holding and shorting costs comprises a min./max. (s,S) inventory policy. Other inventory policies 288 may be used for perishable goods, such as fruit, vegetables, dairy, fresh meat, as well as electronics, fashion, and similar items for which demand drops significantly after a next generation of electronic devices or a new season of fashion is released.

Store data 290 may comprise data describing the stores of one or more retailers and related store information. Store data 290 may comprise, for example, a store ID, store description, store location details, store location climate, store type, store opening date, lifestyle, store area (expressed in, for example, square feet, square meters, or other suitable measurement), latitude, longitude, and other similar data.

Customer data 292 may comprise customer identity information, including, for example, customer relationship management data, loyalty programs, and mappings between product purchases and one or more customers so that a customer associated with a transaction may be identified. Customer data 292 may comprise data relating customer purchases to one or more products, geographical regions, store locations, or other types of dimensions.

Demand forecasts 294 of database 134 may indicate future expected demand based on, for example, any data relating to past sales, past demand, purchase data, promotions, events, or the like of one or more supply chain entities 140. Demand forecasts 294 may cover a time interval such as, for example, by the minute, hour, daily, weekly, monthly, quarterly, yearly, or any other suitable time interval, including substantially in real time. Demand may be modeled as a negative binomial or Poisson-Gamma distribution. According other embodiments, the model may take into account shelf-life of perishable goods (which may range from days (e.g. fresh fish or meat) to weeks (e.g. butter) or even months, before any unsold items have to be written off as waste) as well as influences from promotions, price changes, rebates, coupons, and even cannibalization effects within an assortment range. In addition, customer behavior is not uniform but varies throughout the week and is influenced by seasonal effects and the local weather, as well as many other contributing factors. Accordingly, even when demand generally follows a Poisson-Gamma model, the exact values of the parameters of the model may be specific to a single product to be sold on a specific day in a specific location or sales channel and may depend on a wide range of frequently changing influencing causal factors. As an example, only and not by way of limitation, an exemplary supermarket may stock twenty thousand items at one thousand locations. If each location of this exemplary supermarket is open every day of the year, planning and execution system 130 comprising a demand planner would need to calculate approximately $2 \times 10^{\textasciicircum}10$ demand forecasts 294 each day to derive the optimal order volume for the next delivery cycle (e.g., three days).

Supply chain models 296 of database 134 comprise characteristics of a supply chain setup to deliver the customer expectations of a particular customer business model. These characteristics may comprise differentiating factors, such as, for example, MTO (Make-to-Order), ETO (Engineer-to-Order) or MTS (Make-to-Stock). However, supply chain models 296 may also comprise characteristics that specify the supply chain structure in even more detail, including, for example, specifying the type of collaboration with the customer (e.g. Vendor-Managed Inventory (VMI)), from where products may be sourced, and how products may be allocated, shipped, or paid for, by particular customers. Each of these characteristics may lead to a different supply chain model 296. Prediction models 298 comprise one or more of the trained models used by planning and execution system 130 for predicting a retail volume, such as, for example, a forecasted demand volume for one or more items at one or more stores of one or more retailers.

FIG. 3 illustrates an exemplary method 300 of operating autonomous data hub 110 to generate machine learning models and clean data, in accordance with an embodiment. Method 300 proceeds by one or more actions, which although described in a particular order, may be performed in one or more permutations, according to particular needs.

At activity 302, data ingestion module 202 of autonomous data hub server 112 transfers historical supply chain data 250 from archiving system 120, and/or transaction data 280, supply chain data 282, product data 284, inventory data 286, store data 290, and/or customer data 292 from planning and execution system 130, into input data 210 of autonomous data hub database 114.

At activity 304, data ingestion module 202 stores input data 210 metadata as semantic metadata 216, including but not limited to data relating to the original source of input data 210 within supply chain network 100, the date and time at which input data 210 was last modified and by what system or entity in supply chain network 100, and a complete list of all modifications made to input data 210, in permissioned blockchain data 212. Data management module 203 stores a subset of input data 210 metadata in cache data 213. In other embodiments, data retrieval module 240 of archiving system 120 may transfer historical supply chain data 250 from archiving system 120 to input data 210 of autonomous data hub database 114.

At activity 306, training module 204 trains one or more machine learning models. Training module 204 accesses input data 210, permissioned blockchain data 212, cache data 213, and/or any other data stored in autonomous data hub database 114, archiving system 120, and/or planning and execution system 130. Training module 204 uses input data 210, permissioned blockchain data 212, cache data 213, and/or other data to generate and train one or more machine learning models to identify errors in input data 210 and to standardize input data 210 according to one or more standards and/or common vocabularies. Training module 204 may use any machine learning process, including but not limited to one or more common optimization processes and/or one or more cyclic boosting processes, to train one or more machine learning models.

At activity 308, having trained one or more machine learning models, training module 204 stores the one or more machine learning models in models data 214. Training module 204 may store models data 214 metadata as semantic metadata 216, including but not limited to data relating to each change training module 204 made to models data 214 while training, as well as the dates, times, and natures of each change, in permissioned blockchain data 212. Training module 204 may store data identifying one or more systemic errors and/or one or more one-off errors, identified by the one or more machine learning models, in data errors data 219. Training module 204 may store, in data fixes data 220, data describing one or more data fixes to correct the one or more data errors.

At activity 310, data quality engine 206 transforms input data 210 into cleaned data 222. Data quality engine 206 accesses input data 210, permissioned blockchain data 212, cache data 213, models data 214, semantic metadata 216, data characteristics/signature data 217, business outcomes data 218, data errors data 219, data fixes data 220, and/or any other data stored in autonomous data hub database 114, archiving system 120, and/or planning and execution system 130. Data quality engine 206 uses one or more machine learning models stored in models data 214 and data stored in semantic metadata 216, permissioned blockchain data 212, cache data 213, data characteristics/signature data 217, business outcomes data 218, data errors data 219, and data fixes data 220 to autonomously transform input data 210, remove and/or correct errors, and standardize input data 210 for subsequent use in supply chain system. Data quality engine 206 may store the transformed input data 210 as cleaned data 222 in data lake data 224.

At activity 312, data quality engine 206 stores cleaned data 222 metadata as semantic metadata 216, including but not limited to data relating to each change data quality engine 206 made to input data 210 while transforming input data 210 into cleaned data 222, as well as the dates, times, and natures of each change, in permissioned blockchain data 212 and cache data 213.

At activity 314, data quality engine 206 determines whether to proceed to activity 316 and update one or more machine learning models, or to proceed to activity 306 and train one or more machine learning models. Data quality engine 206 may respond to updates in permissioned blockchain data 212, including but not limited to updates due to latency in permissioned blockchain data 212, to determine whether to proceed to activity 316 or activity 306.

At activity 316, training module 204 updates one or more machine learning models stored in models data 214. Training module 204 accesses input data 210, permissioned blockchain data 212, cache data 213, models data 214, semantic metadata 216, data characteristics/signature data 217, business outcomes data 218, data errors data 219, data fixes data 220, cleaned data 222, and/or any other data stored in autonomous data hub database 114, archiving system 120, and/or planning and execution system 130. In an embodiment, training module 204 uses input data 210, permissioned blockchain data 212, cache data 213, semantic metadata 216, data characteristics/signature data 217, business outcomes data 218, data errors data 219, data fixes data 220, and cleaned data 222 to update one or more machine learning models, stored in models data 214, to more accurately identify errors in input data 210 and to standardize input data 210 according to one or more standards and/or common vocabularies. In an embodiment, training module 204 uses one or more iterative machine learning processes, including but not limited to a cyclic boosting process, to train one or more machine learning models to more accurately identify errors in input data 210 and to standardize input data 210 according to one or more standards and/or common vocabularies. Training module 204 may train one or more machine learning models to recognize data errors by locating sources of data error and changes made to data that are recorded in permissioned blockchain. Having updated one or more machine learning models, training module 204 may store the one or more updated machine learning models in models data 214. In an embodiment, data quality engine 206 may subsequently make use of the one or more updated machine learning models at third activity 306 of the method to autonomously transform input data 210, remove and/or correct errors, and standardize input data 210 for subsequent use in supply chain network 100.

At activity 318, data ingestion module 202 determines whether to terminate the actions of the method or proceed to activity 320 and join or aggregate multiple sets of cleaned data 222. Data ingestion module 202 may respond when multiple sets of cleaned data 222 are stored in data lake data 224 to determine whether to terminate the actions of the method or proceed to activity 320.

At activity 320, data ingestion module 202 joins or aggregates sets of cleaned data 222 from two or more sources (including but not limited to separate supply chain entities, separate databases, and/or separate supply chain networks), and stores the combined sets of cleaned data 222 in joined/aggregate data 226 of the autonomous data hub database 114. This is described in more detail below in FIG. 4. Having generated joined/aggregate data 226, data ingestion module 202 may return to activity 306 and continue the actions described above. In an embodiment, data ingestion module 202 may retrieve sets of cleaned data 222 from data lake data 224.

To illustrate the operation of autonomous data hub 110 executing the above-described method to transform input data 210, train machine learning models, and continuously learn to detect and fix data errors and outliers, the following example is provided. In this example, autonomous data hub 110 receives data from a manufacturer (referred to for the purposes of this example as "Manufacturer X"), a retailer ("Retailer Y"), and a supplier ("Supplier Z") operating in supply chain network 100. Although particular examples of autonomous data hub 110 are described herein within the context of this example, embodiments contemplate autonomous data hub 110 executing the actions of the above-described method to input supply chain data 282, train machine learning models, clean supply chain data 282, and update machine learning models in any order and with respect to any data, according to particular needs.

In this example, at activity 302, data ingestion module 202 of autonomous data hub server 112 transfers historical supply chain data 250 from archiving system 120 into input data 210 of autonomous data hub database 114. In this example, archiving system 120 historical supply chain data 250 comprises supply chain data 282, including but not limited to sales transactions, resource consumption figures, and accounting data stored in archiving system 120 by each of Manufacturer X, Retailer Y, and Supplier Z.

Continuing the example, at activity 304, data ingestion module 202 stores input data 210 metadata as semantic metadata 216, including but not limited to data relating to the original source of input data 210 within supply chain network 100, the date and time at which input data 210 was last modified and by what system or entity in supply chain network 100, and a complete list of all modifications made to input data 210, in permissioned blockchain data 212. Data management module 203 stores a subset of input data 210 metadata in cache data 213.

Continuing the example, at activity 306, training module 204 trains one or more machine learning models. In this example, training module 204 accesses input data 210 (comprising each of Manufacturer X's, Retailer Y's, and Supplier Z's supply chain data 282), permissioned blockchain data 212 (comprising metadata relating to each of Manufacturer X's, Retailer Y's, and Supplier Z's supply chain data 282), and cache data 213 (comprising subset of metadata relating to each of Manufacturer X's, Retailer Y's, and Supplier Z's supply chain data 282). Training module 204 uses input data 210, permissioned blockchain data 212, and cache data 213 to identify errors in input data 210 and to standardize input data 210 according to a common vocabulary. In this example, training module 204 uses a common optimization process to train a machine learning model ("Model 1") to recognize and identify the following errors in input data 210: (1) Manufacturer X chronically under-reports actual resource consumption by 3%, when comparing Manufacturer X supply chain data 282 to the consensus of other data stored in supply chain network 100; (2) Retailer Y records half of its sales data in Pounds Sterling (GBP) instead of the United States Dollars (USD) common currency used throughout the rest of supply chain network 100; and (3) Supplier Z stores its accounting data in a series of incompatible file storage formats, instead of the standard Microsoft Excel file format used throughout the rest of supply chain network 100.

Continuing the example, at activity 308, having trained Model 1 to recognize and identify the above-described errors in input data 210, training module 204 stores Model 1 in models data 214. Training module 204 stores models data 214 metadata as semantic metadata 216, including but not limited to data relating to each change training module 204 made to models data 214 while training Model 1, as well as the dates, times, and natures of each change, in permissioned blockchain data 212 and cache data 213. Training module 204 stores data identifying each of the three above-described errors in data errors data 219. Training module 204 stores, in data fixes data 220, data describing the following fixes to correct each of the three above-described errors: (1) multiply Manufacturer X's recorded resource consumption by an additional 3% to calculate and store Manufacturer X's actual resource consumption; (2) convert the portion of Retailer Y's sales data that is stored in GBP to USD; and (3) convert Supplier Z's non-Excel accounting data into the Excel file format using one or more file format conversion programs.

Continuing the example, at activity 310, data quality engine 206 transforms input data 210 into cleaned data 222. Data quality engine 206 accesses input data 210 (comprising in this example each of Manufacturer X's, Retailer Y's, and Supplier Z's supply chain data 282), permissioned block-chain data 212 (comprising metadata relating to each of each of Manufacturer X's, Retailer Y's, and Supplier Z's supply chain data 282), cache data 213 (comprising subset of metadata relating to each of Manufacturer X's, Retailer Y's, and Supplier Z's supply chain data 282), models data 214 (comprising Model 1), semantic metadata 216 (comprising data interface and data transformation maps for each of Manufacturer X, Retailer Y, and Supplier Z), data charac-teristics/signature data 217 (comprising type of data con-tained in each of Manufacturer X's, Retailer Y's, and Supplier Z's supply chain data 282), business outcomes data 218, data errors data 219 (comprising the three above-described errors), and data fixes data 220 (comprising the three above-described corrections to the three errors). Data quality engine 206 uses Model 1 and data stored in semantic metadata 216, permissioned blockchain data 212, data char-acteristics/signature data 217, business outcomes data 218, data errors data 219, and data fixes data 220 to autono-mously transform input data 210, remove and correct errors, and standardize input data 210 for subsequent use in the supply chain system (in this example, by (1) multiplying Manufacturer X's recorded resource consumption by an additional 3% to calculate and store in the cleaned data 222 Manufacturer X's actual resource consumption; (2) convert-ing the portion of Retailer Y's sales data that is stored in GBP to USD; and (3) converting Supplier Z's non-Excel accounting data into the Excel file format). Data quality engine 206 stores the transformed input data 210 as cleaned data 222 in data lake data 224.

Continuing the example, at activity 312, data quality engine 206 stores cleaned data 222 metadata as semantic metadata 216, including but not limited to data relating to each change data quality engine 206 made to input data 210 while transforming input data 210 into cleaned data 222, as well as the dates, times, and natures of each change, in permissioned blockchain data 212 and cache data 213.

Continuing the example, at activity 314, data quality engine 206 retrieves permissioned blockchain data 212 and cache data 213 and checks for updates compared to permis-sioned blockchain data 212 and cache data 213 used in previous actions to train Model 1 and generate cleaned data 222. Absent any updates, including due to blockchain latency, data quality engine 206 decides to proceed to eighth action.

Continuing the example, at activity 316, training module 204 updates Model 1 to more accurately identify errors in input data 210 and to standardize input data 210 according to a common vocabulary. Training module 204 accesses input data 210, permissioned blockchain data 212, cache data 213, models data 214, semantic metadata 216, data characteristics/signature data 217, business outcomes data 218, data errors data 219, data fixes data 220, cleaned data 222, and/or any other data stored in autonomous data hub database 114, archiving system 120, and/or planning and execution system 130. Training module 204 uses input data 210, permissioned blockchain data 212, cache data 213, semantic metadata 216, data characteristics/signature data 217, business outcomes data 218, data errors data 219, data fixes data 220, and cleaned data 222 to update Model 1 to more accurately identify Manufacturer X, Retailer Y, and Supplier Z errors in input data 210 and to standardize input data 210 according to a common vocabulary. In this example, training module 204 recognizes that, over time, Manufacturer X continues to chronically under-report actual resource consumption, but Retailer Y begins to record all sales data in the correct USD format and Supplier Z begins to store all accounting data in the correct Excel file format. Training module 204 updates Model 1 to continue to correct the Manufacturer X under-reporting error, but to no longer require currency conversion for Retailer Y or file format conversion for Supplier Z if Retailer Y and Supplier Z are using the correct currency and file format. Having updated Model 1, training module 204 stores Model 1 in models data 214. In this example, data quality engine 206 continues to make use of the updated Model 1 at activity 306 of the method to autonomously transform input data 210, remove and/or correct errors, and standardize input data 210 for subsequent use in the supply chain system.

Continuing the example, at activity 318, data ingestion module 202 checks data lake data 224 for multiple sets of cleaned data 222. In this example, data ingestion module determines that cleaned data 222 for Manufacturer X, Retailer Y, and Supplier Z should be combined.

Concluding the example, at activity 320, data ingestion module 202 retrieves cleaned data 222 for Manufacturer X, Retailer Y, and Supplier Z from data lake data 222, combines the data sets, and stores the combined data set as joined/aggregate data 226. In this example, joined/aggregate data 226 is provided as an input to activity 304 and processed through activity 318, with no additional sources of cleaned data for further combination. Autonomous data hub 110 then terminates the actions of the method.

Figure 4:
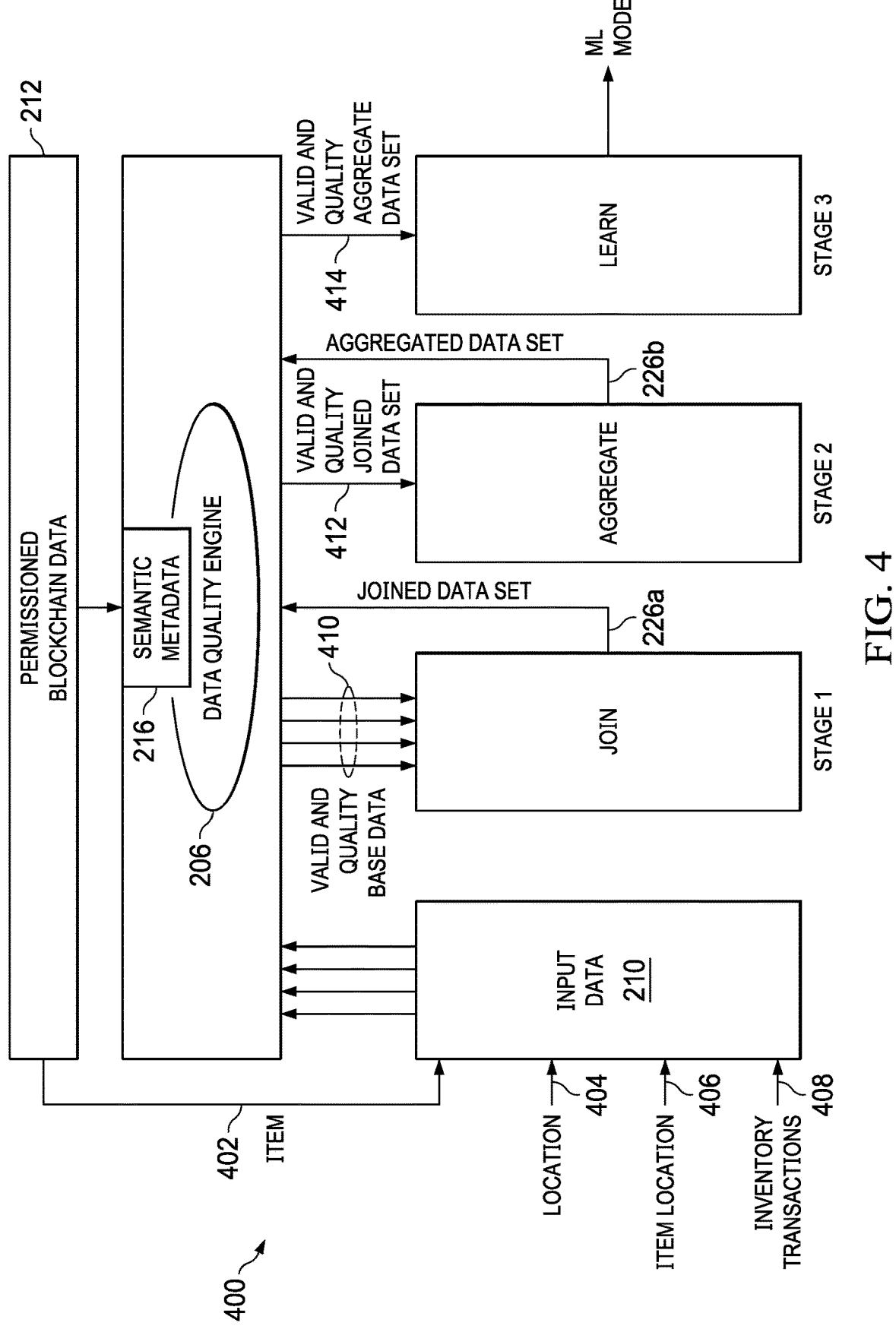
FIG. 4 illustrates the machine learning data pipeline 400, in accordance with an embodiment.

FIG. 4 illustrates machine learning data pipeline 400, in accordance with an embodiment. Machine learning data pipeline 400 may involve cleaning, joining, and aggregating data sets related to Items 402, Locations 404, ItemLocations

406, and InventoryTransactions 408, according to embodiments. Although a particular example of machine learning data pipeline 400 is illustrated and described herein, embodiments contemplate machine learning data pipeline 400 processing any relevant data in any configuration of cleaning, joining, and aggregating steps, according to particular needs.

To illustrate the operation of machine learning data pipeline 400 cleaning, joining, and aggregating data, the following example is provided. In this example, data sets related to Items 402, Locations 404, ItemLocations 406, and InventoryTransactions 408 are transferred to input data 210. Using permissioned blockchain data 212, semantic metadata 216, and any other relevant supply chain data, data quality engine 206 cleans the data sets related to Items 402, Locations 404, ItemLocations 406, and InventoryTransactions 408 and stores the data sets as valid and quality base data 410. Data ingestion module 202 joins valid and quality base data 410 and stores the data as joined data set 226a. Data quality engine 206 cleans joined data set 226a and stores the data as valid and quality joined data set 412. Data ingestion module 202 aggregates valid and quality joined data set 412 and stores the data as aggregate data set 226b. Data quality engine 206 cleans aggregate data set 226b and stores the data as valid and quality aggregate data set 414. Training module 204 retrieves valid and quality aggregate data set 414 to train one or more machine learning models.

Reference in the foregoing specification to "one embodiment", "an embodiment", or "some embodiments" means that a particular causal factor, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for a machine learning data pipeline to provide a valid and quality aggregate data set for training one or more machine learning models, comprising:
   a computer comprising a processor and memory, the computer configured to:
   transfer one or more initial data sets to input data;
   clean the one or more initial data sets by removing one or more first errors in the one or more initial data sets and store the one or more data sets as valid and quality base data;
   join the valid and quality base data and store the joined valid and quality base data as a joined data set;
   clean the joined data set by removing one or more second errors in the joined data set and store the cleaned joined data set as a valid and quality joined data set;
   aggregate the valid and quality joined data set and store the aggregated valid and quality joined data set as an aggregated data set;
   clean the aggregated data set by removing one or more third errors in the aggregated data set and store the cleaned aggregated data set as the valid and quality aggregate data set;
   identify, using permissioned blockchain data, a specific system in a supply chain network and a date and a time at which the one or more first errors, the one or more second errors and the one or more third errors were introduced and a manner in which the one or more first errors, the one or more second errors and the one or more third errors occurred, wherein the manner in which the one or more first errors, the one or more second errors and the one or more third errors occurred is due to latency in the permissioned blockchain data, and wherein the permissioned blockchain data comprises blockchain records and blockchain transaction data; and
   retrieve the valid and quality aggregate data set for training the one or more machine learning models.

2. The system of claim 1, wherein the input data comprises one or more of: item data, location data, item-location data and inventory transaction data.

3. The system of claim 1, wherein the one or more initial data sets further comprise the permissioned blockchain data.

4. The system of claim 1, wherein the one or more initial data sets further comprise semantic metadata.

5. The system of claim 1, wherein the computer is further configured to:
   store metadata of one or more machine learning models as semantic metadata in the permissioned blockchain data.

6. A computer implemented method for a machine learning data pipeline to provide a valid and quality aggregate data set for training one or more machine learning models, comprising:
   transferring, by a computer comprising a processor and memory, one or more initial data sets to input data;
   cleaning, by the computer, the one or more initial data sets by removing one or more first errors in the one or more initial data sets and store the one or more data sets as valid and quality base data;
   joining, by the computer, the valid and quality base data and storing, by the computer, the joined valid and quality base data as a joined data set;
   cleaning, by the computer, the joined data set by removing one or more second errors in the joined data set and storing, by the computer, the cleaned joined data set as a valid and quality joined data set;
   aggregating, by the computer, the valid and quality joined data set and storing, by the computer, the aggregated valid and quality joined data set as an aggregated data set;
   cleaning, by the computer, the aggregated data set by removing one or more third errors in the aggregated data set and storing, by the computer, the cleaned aggregated data set as the valid and quality aggregate data set;
   identifying, by the computer using permissioned blockchain data, a specific system in a supply chain network and a date and a time at which the one or more first errors, the one or more second errors and the one or more third errors were introduced and a manner in which the one or more first errors, the one or more second errors and the one or more third errors occurred, wherein the manner in which the one or more first errors, the one or more second errors and the one or more third errors occurred is due to latency in the permissioned blockchain data, and wherein the permissioned blockchain data comprises blockchain records and blockchain transaction data; and
   retrieve, by the computer, the valid and quality aggregate data set for training the one or more machine learning models.

7. The computer implemented method of claim 6, wherein the input data comprises one or more of: item data, location data, item-location data and inventory transaction data.

8. The computer implemented method of claim 6, wherein the one or more initial data sets further comprise the permissioned blockchain data.

9. The computer implemented method of claim 7, wherein the one or more initial data sets further comprise semantic metadata.

10. The computer implemented method of claim 6, further comprising:

storing, by the computer, metadata of one or more machine learning models as semantic metadata in the permissioned blockchain data.

11. A non-transitory computer-readable medium embodied with computer program instructions for a machine learning data pipeline to provide a valid and quality aggregate data set for training one or more machine learning models, the computer program instructions when executed by one or more processors:

transfers one or more initial data sets to input data;

cleans the one or more initial data sets by removing one or more first errors in the one or more initial data sets and stores the one or more data sets as valid and quality base data;

joins the valid and quality base data and stores the joined valid and quality base data as a joined data set;

cleans the joined data set by removing one or more second errors in the joined data set and stores the cleaned joined data set as a valid and quality joined data set;

aggregates the valid and quality joined data set and stores the aggregated valid and quality joined data set as an aggregated data set;

cleans the aggregated data set by removing one or more third errors in the aggregated data set and stores the cleaned aggregated data set as the valid and quality aggregate data set;

identifies, using permissioned blockchain data, a specific system in a supply chain network and a date and a time at which the one or more first errors, the one or more second errors and the one or more third errors were introduced and a manner in which the one or more first errors, the one or more second errors and the one or more third errors occurred, wherein the manner in which the one or more first errors, the one or more second errors and the one or more third errors occurred is due to latency in the permissioned blockchain data, and wherein the permissioned blockchain data comprises blockchain records and blockchain transaction data; and retrieves the valid and quality aggregate data set for training the one or more machine learning models.

12. The non-transitory computer-readable medium of claim 11, wherein the input data comprises one or more of: item data, location data, item-location data and inventory transaction data.

13. The non-transitory computer-readable medium of claim 11, wherein the one or more initial data sets further comprise the permissioned blockchain data.

14. The non-transitory computer-readable medium of claim 11, wherein the one or more initial data sets further comprise semantic metadata.

15. The non-transitory computer-readable medium of claim 11, the computer program instructions when executed by the one or more processors further:

stores metadata of one or more machine learning models as semantic metadata in the permissioned blockchain data.

* * * * *